(12) United States Patent
Keith

(10) Patent No.: US 7,670,441 B2
(45) Date of Patent: *Mar. 2, 2010

(54) METHOD FOR PREVENTING AIR POLLUTION USING A MOBILE PROCESSING ENCLOSURE

(76) Inventor: Michael Keith, 154 North Rd., Butler, PA (US) 16001

( * ) Notice: Subject to any disclaimer, the term of this patent is extended or adjusted under 35 U.S.C. 154(b) by 0 days.

This patent is subject to a terminal disclaimer.

(21) Appl. No.: 12/044,356

(22) Filed: Mar. 7, 2008

(65) Prior Publication Data

US 2008/0206038 A1    Aug. 28, 2008

Related U.S. Application Data

(62) Division of application No. 11/296,889, filed on Dec. 8, 2005, now Pat. No. 7,407,621.

(51) Int. Cl.
B65H 1/00 (2006.01)
(52) U.S. Cl. .................. 148/194; 266/144; 266/158
(58) Field of Classification Search .................. 266/158, 266/159, 144, 142; 148/194
See application file for complete search history.

(56) References Cited

U.S. PATENT DOCUMENTS

| 3,308,266 | A | * | 3/1967 | Adams, Jr. ............. 219/137 R |
|---|---|---|---|---|
| 3,618,866 | A | | 11/1971 | Robinson |
| 3,928,144 | A | | 12/1975 | Jakimowicz |
| 4,114,864 | A | | 9/1978 | Jager et al. |
| 4,754,581 | A | | 7/1988 | Lengyel et al. |
| 5,201,152 | A | | 4/1993 | Heffner |
| 6,088,974 | A | | 7/2000 | Kloeden, Sr. |
| 6,726,736 | B2 | | 4/2004 | Koclejda et al. |
| 7,407,621 | B2 | * | 8/2008 | Keith ......................... 266/158 |

* cited by examiner

*Primary Examiner*—Scott Kastler
(74) *Attorney, Agent, or Firm*—The Webb Law Firm

(57) ABSTRACT

A method of processing materials at multiple work sites that prevents contamination of the atmosphere. The method includes providing a plurality of work sites containing workpieces, positioning a track connecting the sites, providing a mobile system comprising an enclosure and a treatment system in communication with a space enclosed by the enclosure, moving the mobile system so that the enclosure surrounds the workpieces on the first site, processing those workpieces, moving the mobile system along the track as a single unit onto a second work site, and processing those workpieces on the second site. The enclosure may be readily openable at opposing portions facing the track to enable the enclosure to pass over workpieces on the plurality of work sites. Additionally, a method of constructing an operation for processing workpieces is provided.

20 Claims, 6 Drawing Sheets

METHOD FOR PREVENTING AIR POLLUTION USING A MOBILE PROCESSING ENCLOSURE

CROSS REFERENCE TO RELATED APPLICATIONS

This application is a divisional application of U.S. Patent application Ser. No. 11/296,889, filed Dec. 8, 2005, now U.S. Pat. No. 7,407,621, which is incorporated herein by reference.

BACKGROUND OF THE INVENTION

1. Field of the Invention

The present invention relates to a method and operation for the processing material, such as workpieces or other units of scrap metal, at a plurality of work sites that prevents or limits air pollution during the processing operation.

2. Description of Related Art

In the processing of scrap metal, in particular ferrous metals for recycling in electric arc furnaces or the like, flammable gases in combination with oxygen gas in a cutting torch are used to cut large metal sections, too large for downstream recycling processing, into more useful sizes. Such cutting means are also used for separating recyclable ferrous metals from other materials, which are considered undesirable if melted with the ferrous metal during the recycling process. In the above-described processing cutting torches such as "burning bars" and "powder torches" can be used for preparing stainless steel, heavy metal sections such as pit scrap and tundish scrap, and the like, for recycling processes.

The above-described cutting processes are most often carried out in open-air scrap yards, which process recyclable ferrous metal from scrapped automobiles and appliances, structural members from the demolition of buildings and bridges, rolls from steel mill rolling equipment, and various other sources of ferrous metal suitable for recycling into new steel structures and products.

During preparation of the above-described scrap, with use of the various cutting torches, air-borne pollutants are generated, not only from combustion of the cutting gases and oxidation of the ferrous metals, but from oxidation of non-ferrous metals and other materials which may be incorporated with the metal being cut. The above-described air-borne pollutants are harmful to the environment, and emission of those pollutants to the atmosphere is strictly regulated by government agencies.

Although the present invention is described in relation to use in processing scrap metal, use in other operations such as sand-blasting, painting, sawmills, etc. is available for the invention.

SUMMARY OF THE INVENTION

The present invention is directed to a method of processing workpieces at multiple locations. The method includes the steps of providing a plurality of work sites containing workpieces, positioning a track connecting the sites, providing a mobile system comprising an enclosure and a treatment in communication with a space enclosed by the enclosure, moving the mobile system onto a first work site so that the enclosure surrounds the workpieces on the site, processing those workpieces on the first site, moving the mobile system along the track as a single unit onto a second work site so that the enclosure surrounds the workpieces on the site, and processing those workpieces on the second site.

The enclosure of the mobile system can be readily openable at opposing portions facing the track to enable the enclosure to pass over workpieces on the plurality of work sites.

The present invention optionally includes the step of opening the readily openable portions of the enclosure prior to moving the mobile system onto a work site.

In addition, the present invention may include the step of closing the opened portions of the enclosure after the mobile system has been moved onto a work site.

The track may comprise a plurality of linear rails arranged parallel to each other.

The readily openable portions of the enclosure may include roll-up doors.

The treatment system may include a plurality of associated intake tubes and dampers communicating with the enclosure to enable the selection of various air-flow patterns within the enclosure.

The present invention may also include the step of intaking air from the space enclosed by the enclosure and filtering the air using the treatment system and, optionally, returning the filtered air to the space enclosed by the enclosure.

In one embodiment, the mobile system is moved using an electric motor or internal combustion engine.

The mobile system may optionally include a generator for providing electrical power.

The present invention is also directed to a method of constructing an operation for processing materials comprising the steps of providing a plurality of work sites containing workpieces, constructing a mobile system which includes an enclosure and a treatment system, connecting the treatment system to the enclosure so that the treatment system is in communication with the space enclosed by the enclosure, and installing a track connecting the plurality of work sites, wherein the mobile system is movable along the track between the work sites as a single unit.

BRIEF DESCRIPTION OF THE DRAWINGS

The invention will become more readily apparent from the following description of the preferred embodiments thereof shown, by way of example only, in the accompanying drawings, wherein.

DESCRIPTION OF THE PREFERRED EMBODIMENTS

Figure 1:
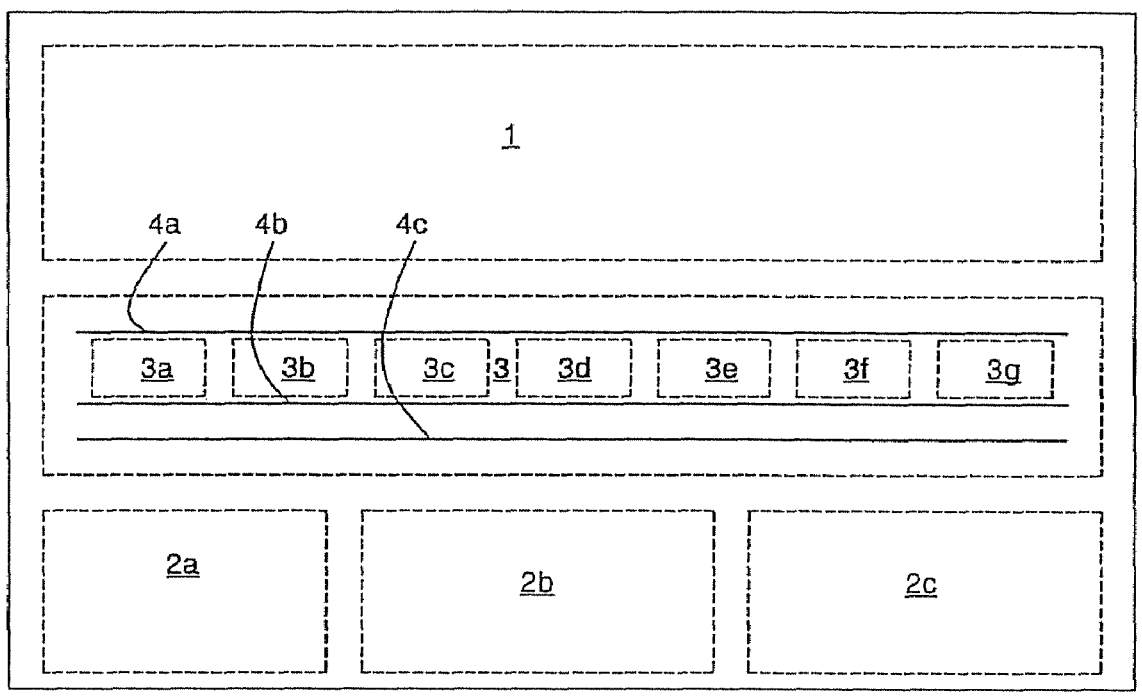
FIG. 1 is a plan view of a layout for a scrap yard for utilizing the system of the present invention.

The present invention is arranged to be operable in essentially any scrap yard. FIG. 1 depicts a typical scrap yard, having the present system of the invention incorporated into it. In FIG. 1, there is denoted an area 1, primarily for unprocessed, mixed scrap, which is stockpiled for processing to separate dissimilar metals and cut large members, too large for melting furnaces or the like, into sizes suitable for downstream recycling processes.

Areas 2a, 2b, and 2c denote areas for storing processed scrap which has been cut to a suitable size and separated by metal type for forwarding to recycling processors.

Between the two above-described areas is located an elongated open work area 3, or work site, in which sorting, cutting, and other scrap processing steps can be carried out. It is in this elongated open work area that the system of the invention can be located.

Although the above-described scrap yard layout is preferred, other layouts can accommodate the system of the invention, as long as a preferably linear track joining open work areas can be located in the scrap yard.

The system of the invention includes at least two parallel rails extending length wise to form a track for supporting components of the invention, in order that the invention might be used at any of the individual open work areas or work sites 3a-3g. In one embodiment, three parallel rails are provided, as shown at 4a, 4b, and 4c. Any material upon which wheels can be supported and guided is available in practice of the invention, including rails such as those used in the railroad industry. The spacing between the rails is determined by the size of the remaining components, which are discussed below. Optionally, the space between the rails and outward of the rails toward the storage areas are provided with gravel or are paved to near the top surfaces of the rails so as to provide a safe and workable surface for carrying out the work.

In FIGS. 2-5 other components of the invention, which are moveable along the rails, are shown. The system includes an enclosure 5 for surrounding a work area and the material to be processed, to prevent substantially any air-borne pollutants from entering the atmosphere. In use of the invention, the enclosure is first positioned on the rails but out of the way of material handling equipment used to position the material to be processed. The material to be processed is placed at one of the individual open work areas, 3a-3g, within a space defined by rails, 4a and 4b. In further describing the invention, the placed material which is to be processed is referred to as the workpieces. With the enclosure 5 first positioned out of the way, for example near open work area 3a, any handling equipment traditionally used for handling and sorting scrap can be used without any interference, for example at open work area 3e. The out of the way location can be at one or the other ends of the track, or in large operations at any point along the track away from the working scrap handling equipment.

Figure 2:
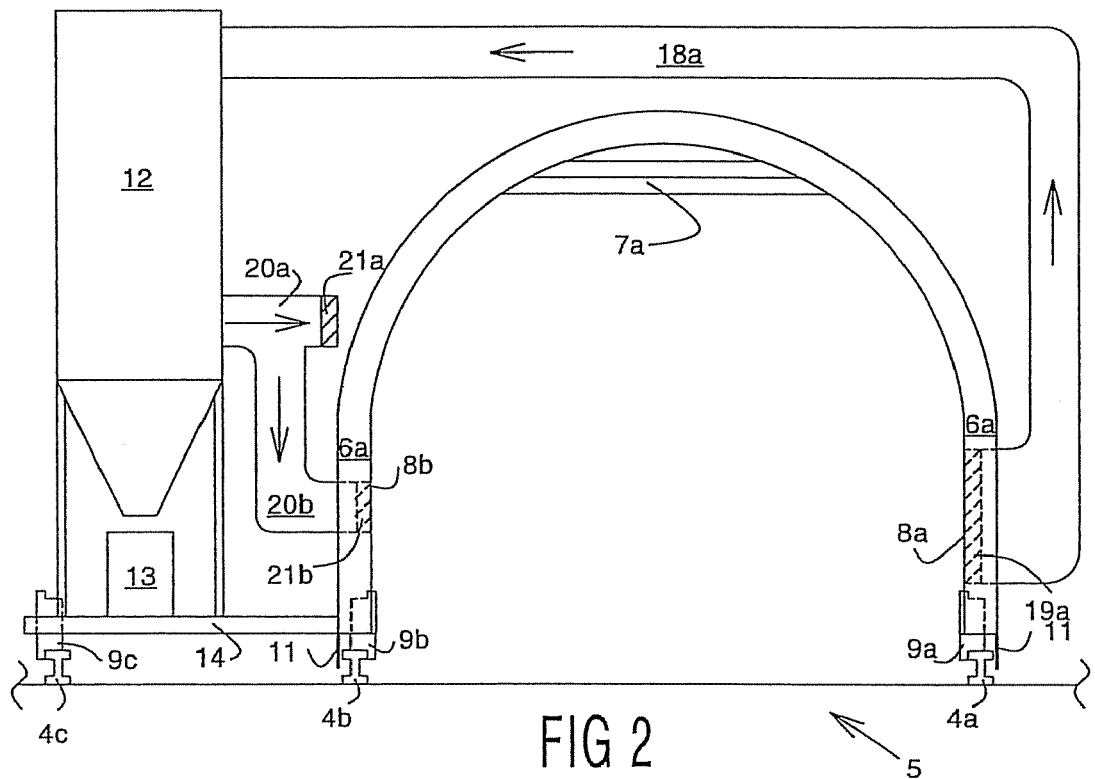
FIGS. 2 and 3 are drawings of the system of the invention as viewed along the length of the track.
Figure 2A:
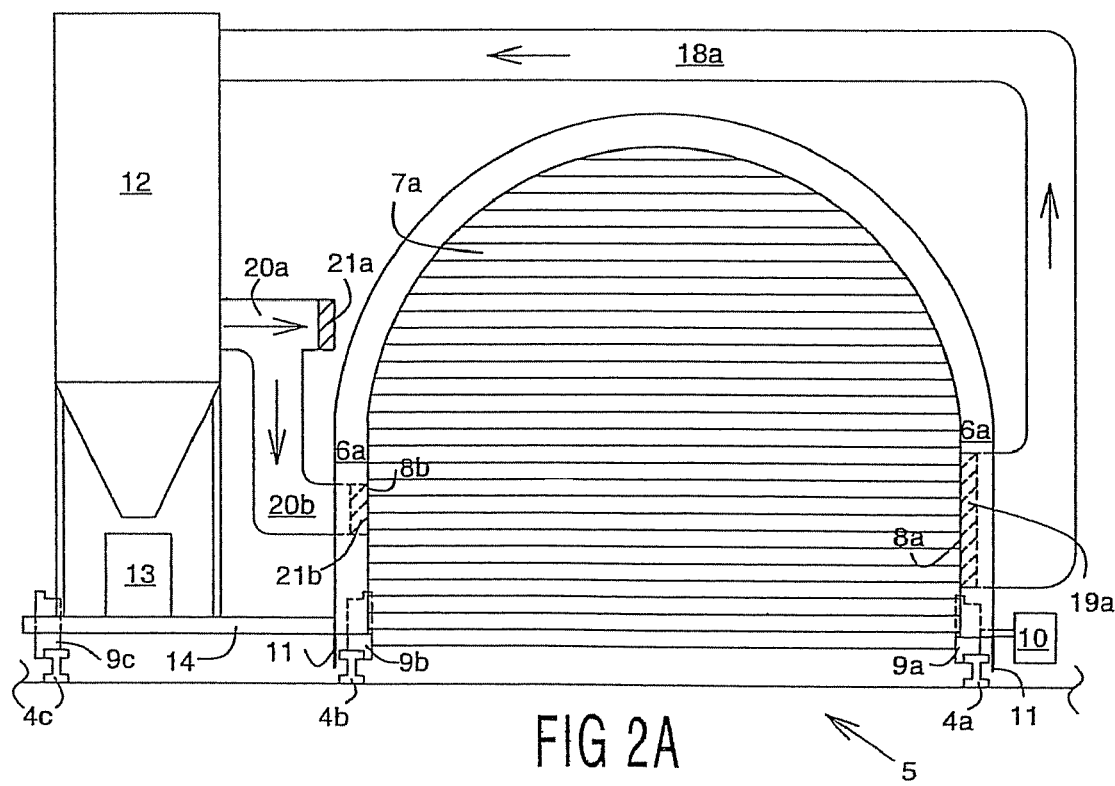
Figure 3:
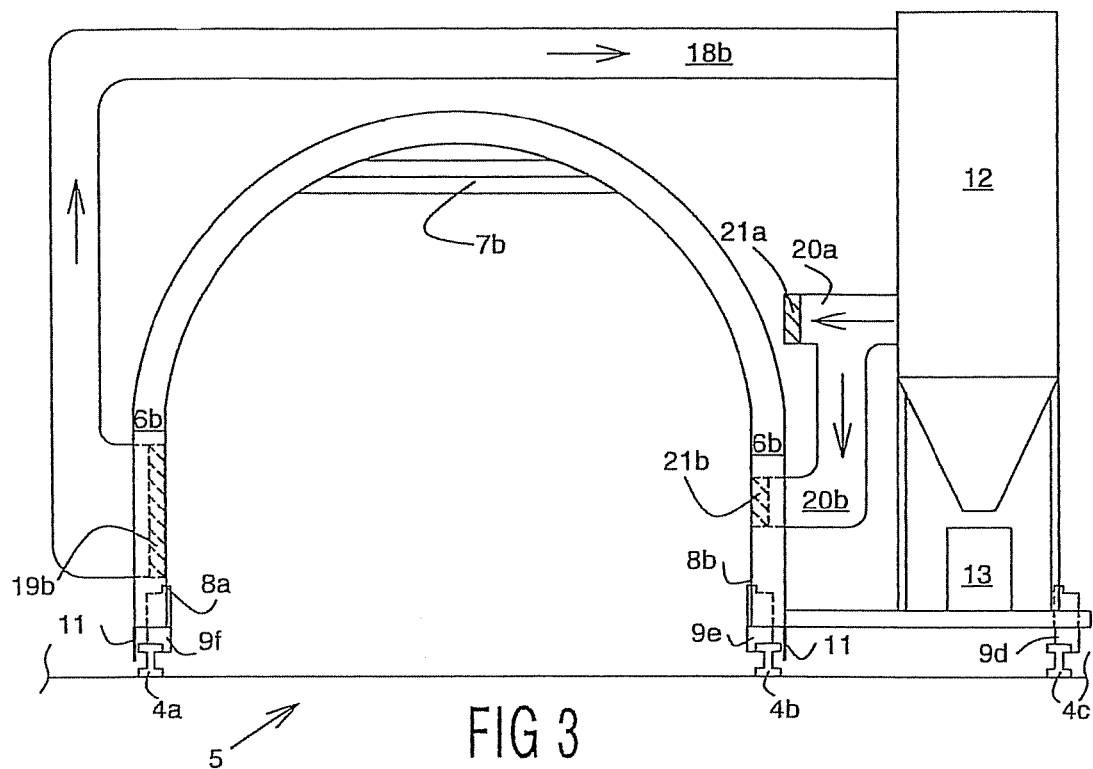
Figure 3A:
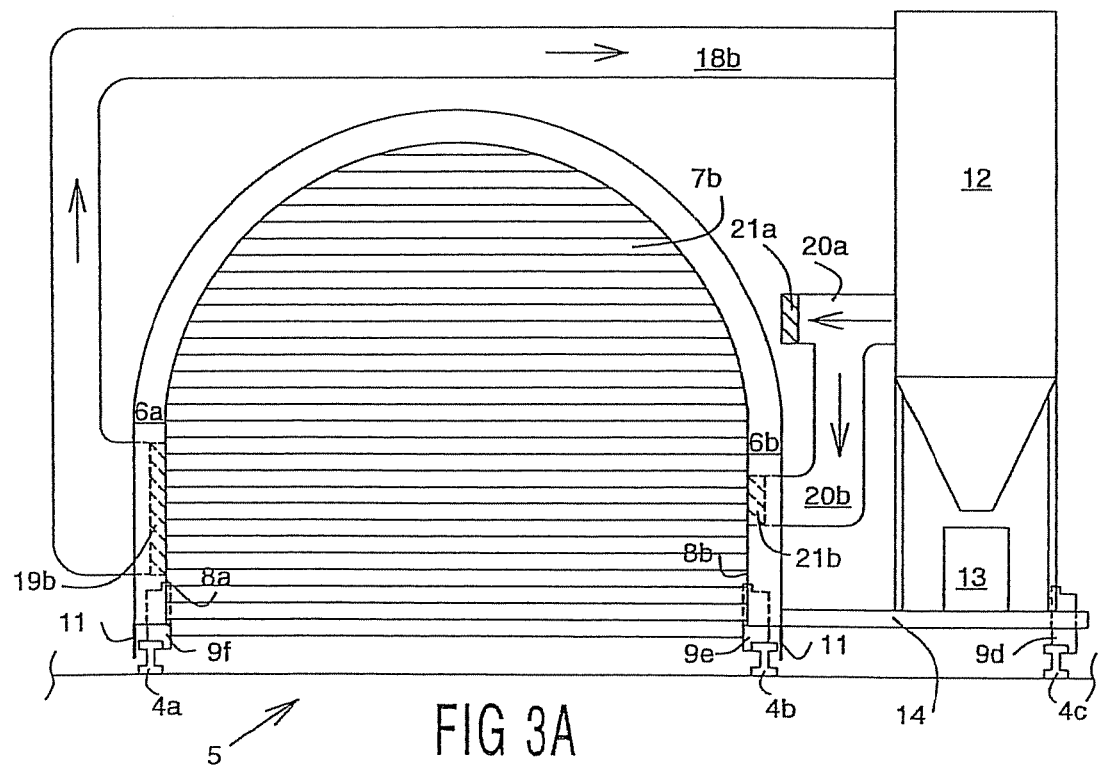
Figure 4:
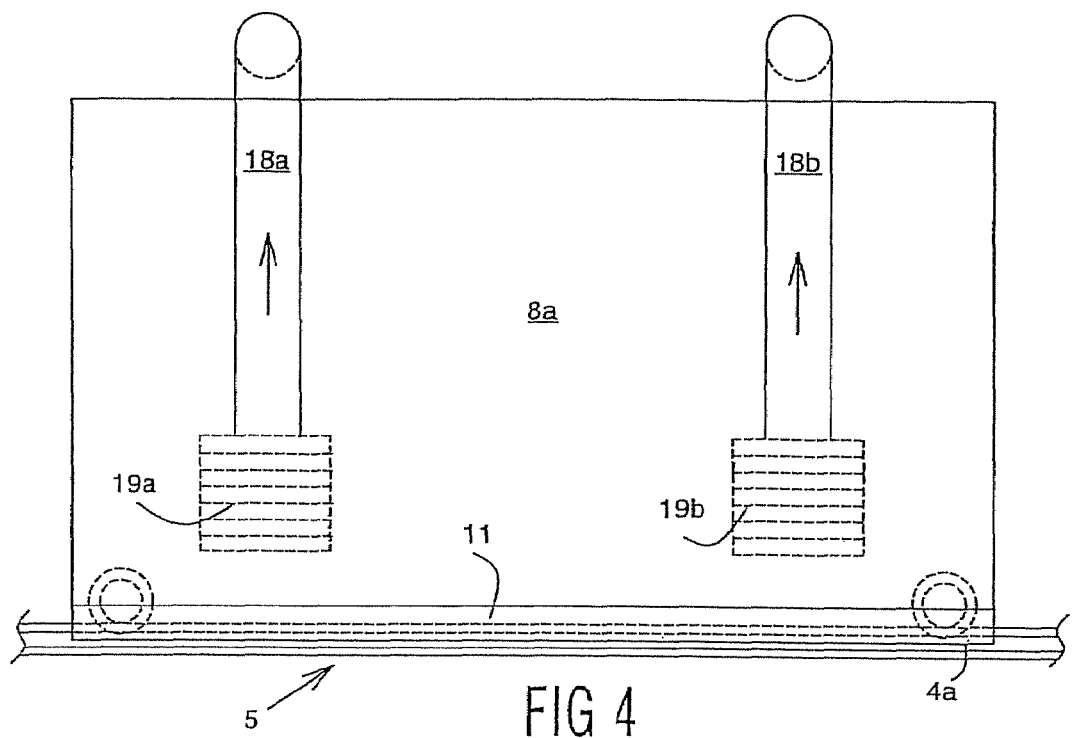
FIGS. 4 and 5 are drawings of the system of the invention as viewed perpendicular to FIGS. 2 and 3.
Figure 5:
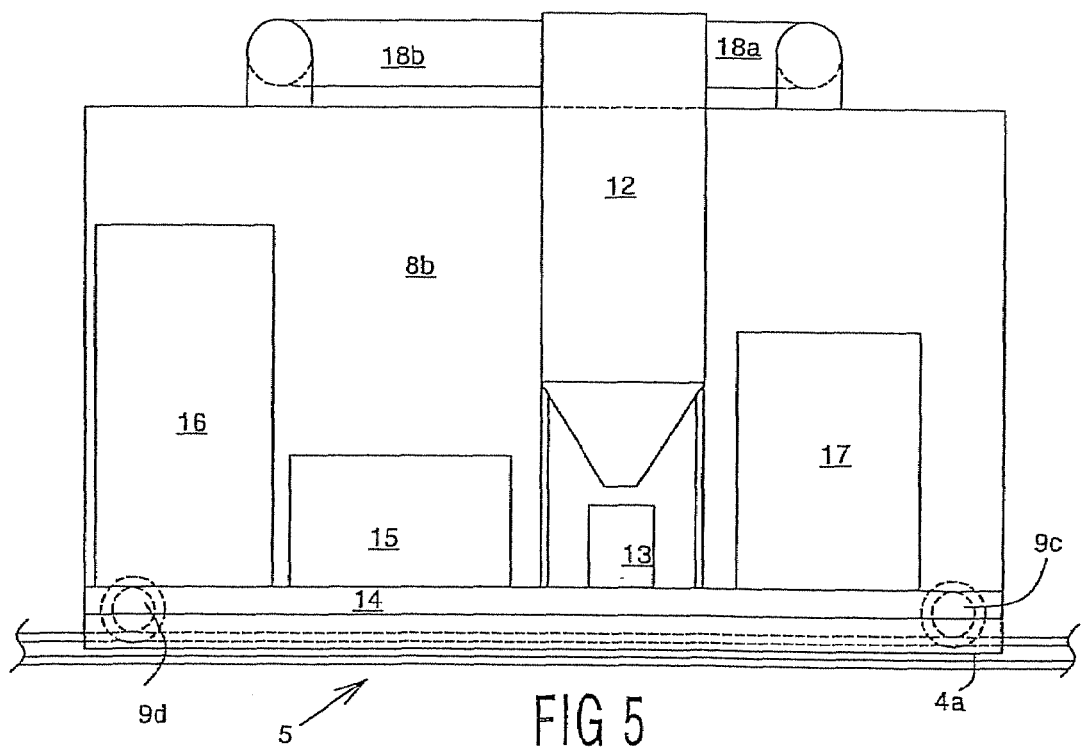

Following positioning of a suitable quantity of workpieces between the rails 4a and 4b, at a selected work area, the enclosure, which includes end walls 6a and 6b, and side walls 8a and 8b, is moved along the rails so as to be located over the selected work area. To enable at least one of the end walls 6a, 6b of the enclosure to pass over positioned workpieces, openable portions 7a, 7b are provided in a portion of the respective end walls at a location between the rails 4a and 4b. Both end walls, 6a and 6b may have openable portions 7a and 7b so that the enclosure is movable along the track, from end to end, and is able to pass over a plurality of different work areas in the process of being filled with workpieces for subsequent processing. The enclosure is moveable with use of a mobile loader, or the like, or the enclosure can be self-propelled by an electric motor or internal combustion engine, incorporated into the system. The motor or engine is engaged with at least one of supporting wheels 9a-9f. In FIG. 2A, electric motor 10 is shown engaged with supporting wheel 9a. In one embodiment, two or more supporting wheels are driven.

Following movement of the enclosure to surround the workpieces, the openable portions 7a and 7b are at least partially closed in order to contain the air-borne pollutants generated during processing of the scrap. In order to more thoroughly contain the pollutants, seals can be provided along bottom edges of the side walls 8a and 8b. The seals are indicated at 11, in FIGS. 2-5. In one embodiment the seals are of a flexible rubber material which make contact with the ground surface. Although seals can also be provided on bottoms of the openable portions 7a and 7b, a completely airtight enclosure is not necessary, and the openable portions can be used for controlling make-up air flow and air pressure within the enclosure, which is described below. The openable portions 7a and 7b of the enclosure 5 can be multi-segmented roll-up doors which are motor operable so as to be easily opened and closed when relocating the enclosure and controlling the air flow and air pressure during a metal cutting operation. The roll-up doors may be sealed at their sides where contact is made to the respective end walls 6a and 6b.

In operation of the system the generated air-borne pollutants are captured so as to be disposed of in a non-polluting, environmentally safe manner. To accomplish such step a filtering, or other treatment system 12 is provided in communication with the space enclosed by the enclosure. The filtering system is arranged to intake air from within the enclosure, which is contaminated with the air borne particles, and exhaust air from which the particles are substantially removed. In one embodiment, the filtered air is exhausted into the atmosphere and provisions for make-up air, such as an intake fan or merely openings in the enclosure are provided. Other modes of operating the filtering system can include a closed system in which all of the filtered air is returned to the enclosure, or a combination of the above two modes, in which a portion of the filtered air is returned to the enclosure and a portion is exhausted to the atmosphere. In one embodiment a slightly negative pressure, in relation to atmospheric pressure, is maintained within the enclosure so as to more surely prevent any contamination of the atmosphere. Such slight negative pressure can be obtained by controlling the volume of air handled by a fan of the filtering system and controlling openings for make-up air.

The filtering component of the system may be selected to incorporate a filtering medium which captures substantially all of the air-borne solid particles. A filtering system having such a medium is a Model GS 24 Dust Collector manufactured by Farr Air Pollution Control, Jonesboro, Ark., 72401. Optionally, in order to operate the system of the invention in a continuous manner, a bank of filters is provided so that some of the filtering medium can be in a collecting mode while remaining filtering medium is in a regeneration mode. Controls can be provided to alternate between the modes in order to operate the filter system in a continuous manner. During the regeneration mode the collected pollutants are dislodged from the filtering medium with use of compressed air or other means and removed from the filtering system in solid form into containers such as 13 to be disposed of in a non-polluting manner. In one filtering system, heavy air-borne particles flow directly to a collection bin while remaining particles are collected on surfaces of the filtering medium.

In one embodiment, all of the above-described filtering and air handling components are attached to the enclosure such as by attached platform 14 to form a single unit which is easily movable along the track. The rail 4c is primarily for supporting one edge of platform 14 while another edge of the platform can be supported by the enclosure.

In order to provide the above-described mobility for the system along the rails and to have electrical power available for the filtering system and electric repositioning motors attached to the wheels, a generator 15 powered by diesel fuel, gasoline, or the like can be incorporated into the system. The generator can be located on platform 14 with the filtering system 12. Other embodiments of the invention can obtain electrical power from power outlets positioned along the rails or a lengthy suspended power cord capable of extending the length of the track. Additional support systems such as electrical breakers and the like, or storage areas can also be located on platform 12, for example as shown at 16.

Use of the various metal cutting torches mentioned above requires a skilled operator, and the working environment can be hot, filled with air pollutants and somewhat dangerous considering the heavy metal workpieces being processed. In view of those undesirable conditions, robotic-like metal cutting torches have been developed and such torches are easily accommodated by the present invention. Although the torches are somewhat automatic, an operator is usually required for remotely controlling the torch. In the system of the present invention, an enclosed control room 17, in which an operator can control the metal cutting torch, can be located along side wall 8b, with a window facing the work area and workpieces. The control room may be sealed from the atmosphere contained by the enclosure. Whether the metal cutting torch is being operated hands-on by an operator or is set up in a robotic-like manner to be operated remotely by an operator in a control room, it is desirable to be able to control the flow patterns of air within the enclosed space. For example if an operator is working in the enclosed space, it is desired to have the flow of contaminated air be directed away from the operator and into the filtering system by the shortest possible path. Also, if the torch control is being controlled remotely, the contaminated air may be directed in a path so as not to obscure the view of the workpieces from the operator in the control room 17. Although the above situations are given as examples, other air-flow patterns may be desired for other reasons.

Control of the air flow pattern is carried out with use of the enclosure openable portions 7a and 7b, filter system intake tubes 18a and 18b fitted with dampers 19a and 19b, and filter system exhaust tubes 20a and 20b fitted with dampers 21a and 21b, shown in FIGS. 2-5. Directional arrows on the tubes indicate the direction of air flow when activated.

Referring to FIGS. 6A-6D, which are top views of the enclosure 5 and platform 14 of the system, various air flow patterns are shown for various configurations of the invention. In FIGS. 6A-6D, the workpieces being processed are depicted at 22. The status of the openable portions of the end walls, 7a and 7b, and the dampers 19a, 19b, 21a and 21b are indicated as being opened or closed. It is to be understood that other air-flow patterns are possible, mainly by partially opening or closing the above listed components. Additionally, the volume of air processed by the filtering system can be varied by controlling the speed of the air handling fan associated with the filtering system.

Figure 6A:
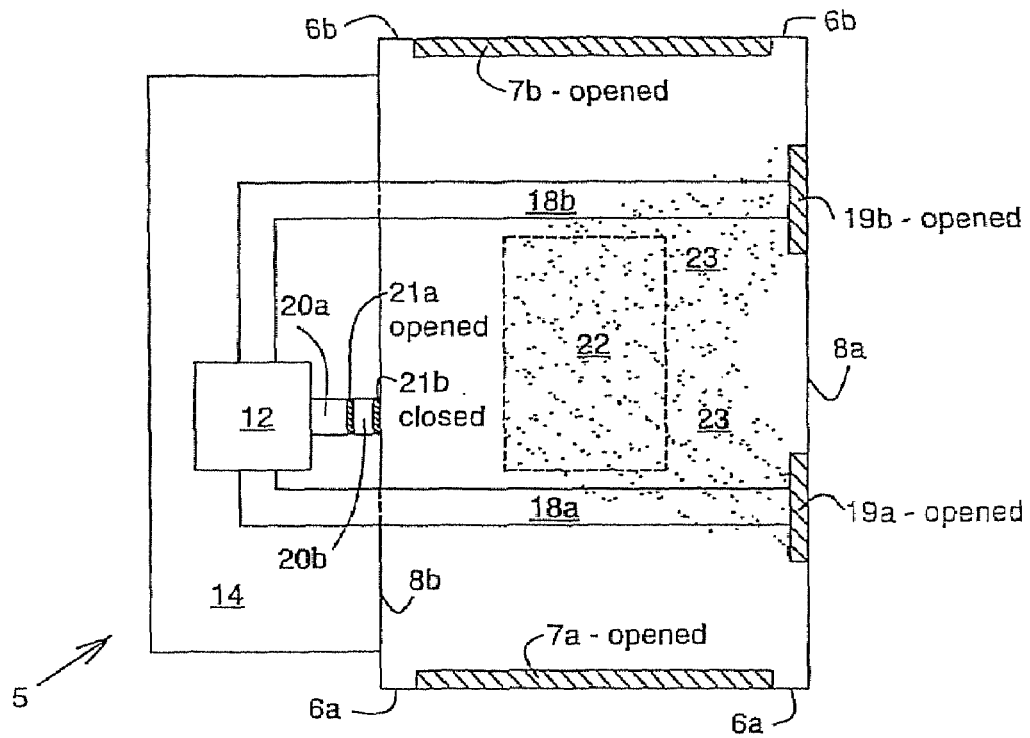
FIGS. 6A-6D are top views of the system of the invention showing examples of air flow patterns which can be set up within the enclosure of the invention.

In FIG. 6A, damper 21b is closed and damper 21a is opened so as to exhaust all of the filtered air to the atmosphere. Also, damper 19a on intake tube 18a is opened, and damper 19b on intake tube 18b is opened. With such an arrangement the generated air-borne particles are drawn into both intake tubes 18a and 18b. With the above-described configuration, specifically with the filtered air being exhausted to the atmosphere, it is necessary to have openings into the chamber for make-up air. In the configuration of FIG. 6A the openable portion 7a of end wall 6a and the openable portion 7b of end wall 6b are partially opened and the general pattern of air flow to carry the air borne pollutants to the filter system is depicted at 23.

Figure 6B:
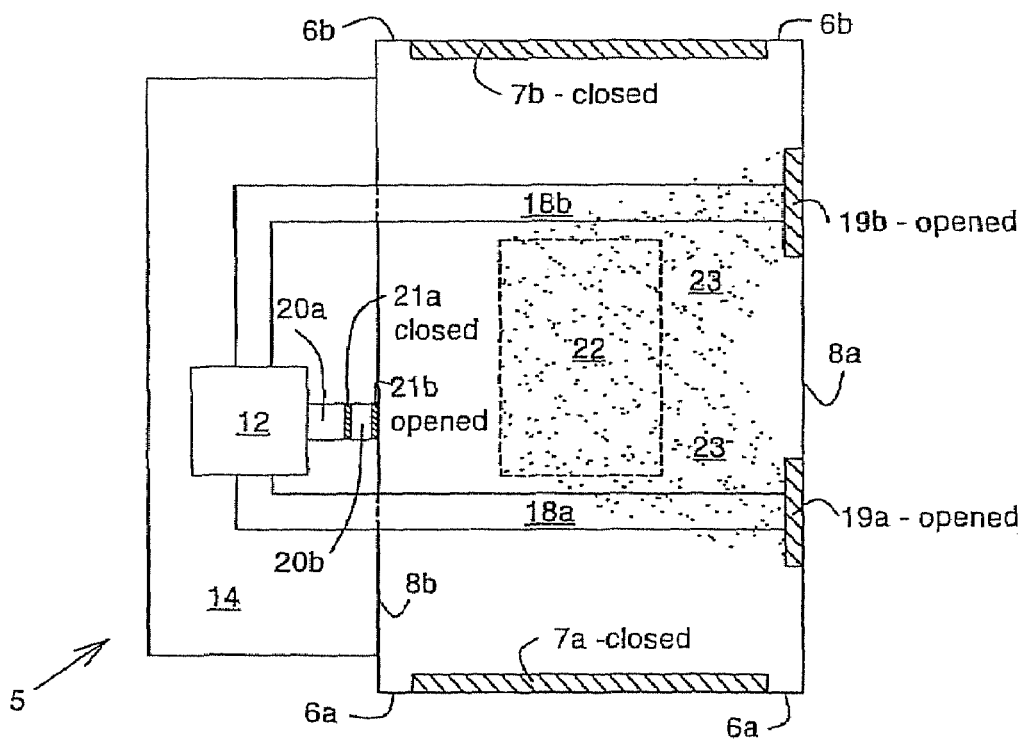

In FIG. 6B, damper 21b is open and damper 21a is closed so as to direct all of the filtered air back into the enclosure 5. Also damper 19a on intake tube 18a is opened and damper 19b on intake tube 18b is opened. With such an arrangement the generated air-borne particles are drawn into both intake tubes 18a and 18b. Since the filtered air is not being exhausted to the atmosphere, it is not necessary to have a source of make-up air and openable portions 7a and 7b of end walls 6a and 6b can be positioned closed.

Although substantially 100% of recycled air is possible with the configuration depicted in FIG. 6B, if a torch operator is within the enclosure 5, introduction of a small percentage of outside air is advisable. The configuration of FIG. 6B is preferred for the comfort of an operator when operating on cold winter days, as the temperature of the air within the chamber is increased by heat from the metal cutting process. Additionally, heaters (not shown) can be provided in the system to further increase the temperature within the chamber.

Figure 6C:
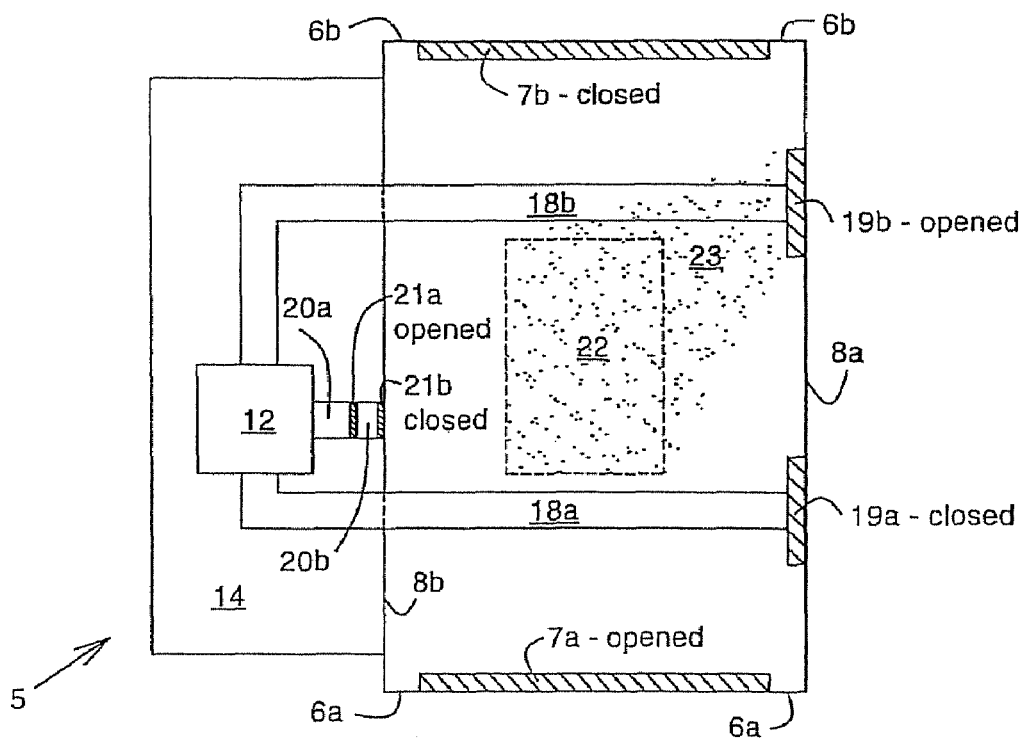
Figure 6D:
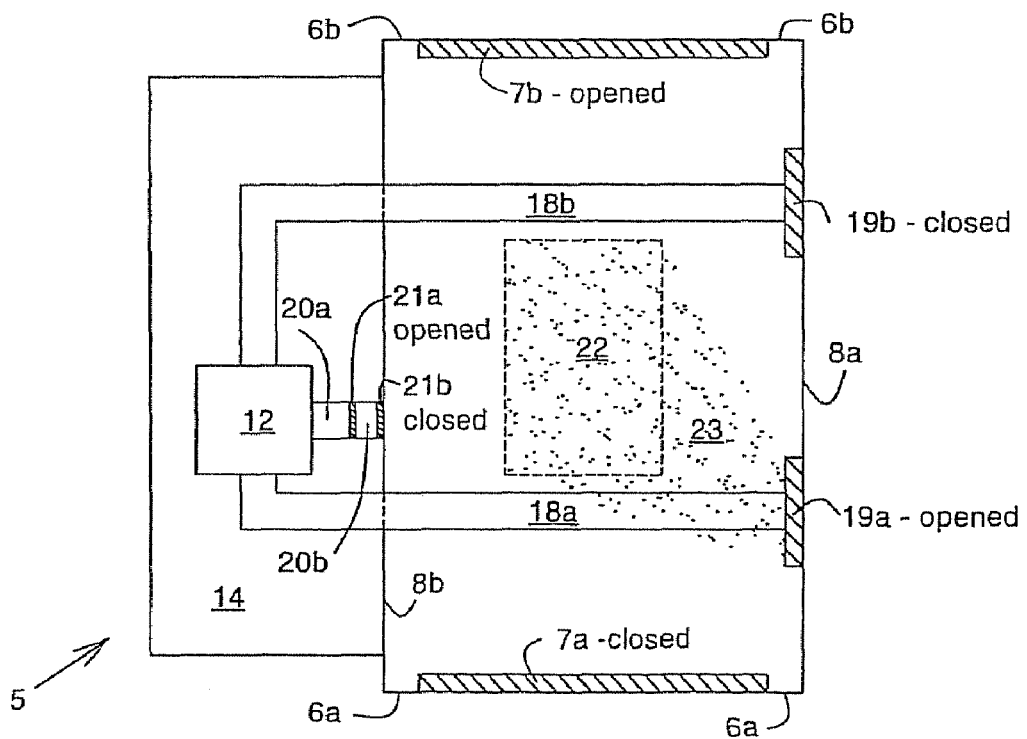

FIGS. 6C and 6D show various other configurations which are possible to control the flow pattern of air-borne particles in order to improve the operability of the cutting process, as discussed above. In FIGS. 6C and 6D the status of the various dampers and operable portions are indicated and the associated air-flow patterns are depicted at 23.

FIGS. 6A-6D are solely a few examples of many combinations possible for the dampers and openable portions. Many other combinations are possible in order to provide suitable air-flow patterns for various operating conditions.

Although the system is described with use of a single enclosure on the track, multiple enclosures are possible to efficiently process large quantities of material.

While specific materials, dimensional data, etc. have been set forth for purposes of describing embodiments of the invention, various modifications can be resorted to, in light of the above teachings, without departing from Applicant's novel contributions; therefore in determining the scope of the present invention, reference shall be made to the appended claims.

What is claimed is:

1. A method of processing workpieces at multiple locations, comprising the steps of:
providing a plurality of work sites;
positioning a track connecting the plurality of work sites;
providing a mobile system comprising an enclosure and a treatment system in communication with a space enclosed by the enclosure;
moving the mobile system onto a first work site so that the enclosure surrounds workpieces on the first work site;
processing the workpieces on the first work site;
moving the mobile system along the track as a single unit onto a second work site so that the enclosure surrounds workpieces on the second work site; and
processing the workpieces that are present on the second work site.

2. The method of claim 1, wherein the enclosure of the mobile system is readily openable at opposing portions facing the track to enable the enclosure to pass over workpieces on the plurality of work sites.

3. The method of claim 2, further comprising the step of at least partially opening the readily openable portions of the enclosure prior to moving the mobile system onto a work site.

4. The method of claim 3, further comprising the step of at least partially closing the opened portions of the enclosure after the mobile system has been moved onto a work site.

5. The method of claim 1, wherein the track comprises a plurality of linear rails arranged parallel to each other.

6. The method of claim 2, wherein the readily openable portions of the enclosure consist essentially of roll-up doors.

7. The method of claim 1, wherein the treatment system includes a plurality of associated intake tubes and dampers communicating with the enclosure, to enable the selection of various air-flow patterns within the enclosure.

8. The method of claim 1, further comprising the step of intaking air from the space enclosed by the enclosure and filtering the air using the treatment system.

9. The method of claim 8, further comprising the step of returning the filtered air to the space enclosed by the enclosure.

10. The method of claim 1, wherein the mobile system is moved using an electric motor or internal combustion engine.

11. The method of claim 1, wherein the mobile system further comprises a generator for providing electrical power.

12. A method of constructing an operation for processing workpieces, comprising the steps of:
providing a plurality of work sites containing workpieces;
constructing a mobile system comprising an enclosure and a treatment system;
connecting the treatment system to the enclosure so that the treatment system is in communication with a space enclosed by the enclosure; and
installing a track connecting the plurality of work sites, wherein the mobile system is movable along the track between the work sites as a single unit.

13. The method of claim 12, wherein the enclosure is readily openable at opposing portions facing the track to enable the enclosure to pass over workpieces on the plurality of work sites.

14. The method of claim 13, wherein the readily openable portions of the enclosure consist essentially of roll-up doors.

15. The method of claim 12, wherein the track comprises a plurality of linear rails arranged parallel to each other.

16. The method of claim 12, wherein the treatment system includes a plurality of associated intake tubes and dampers communicating with the enclosure, to enable the selection of various air-flow patterns within the enclosure.

17. The method of claim 12, wherein the treatment system removes air from the space enclosed by the enclosure and filters the air.

18. The method of claim 17, wherein the treatment system returns the filtered air to the space enclosed by the enclosure.

19. The method of claim 12, wherein the mobile system further comprises a generator for providing electrical power.

20. A method of constructing an operation for processing workpieces, comprising the steps of:
providing an unprocessed workpiece area for storing unprocessed workpieces;
providing a storage area for storing processed workpieces;
providing a plurality of work sites between the unprocessed workpiece area and the storage area;
constructing a mobile system comprising an enclosure and a treatment system;
connecting the treatment system to the enclosure so that the treatment system is in communication with a space enclosed by the enclosure;
installing a track connecting the plurality of work sites; and
positioning the mobile system on the track thereby allowing the mobile system to move along the track between the work sites as a single unit, wherein unprocessed workpieces are transferred from the unprocessed workpiece area to each of the plurality of work sites, the mobile system moves along the track to each of the work sites to process the unprocessed workpieces thereby producing processed workpieces and the processed workpieces are transferred to the storage area.

* * * * *